Nov. 6, 1928.

F. D. HARDESTY

CONTROLLING DEVICE

Filed March 19, 1924

Inventor
FRANCIS D. HARDESTY
By Blackmore, Spencer & Fish
His Attorneys

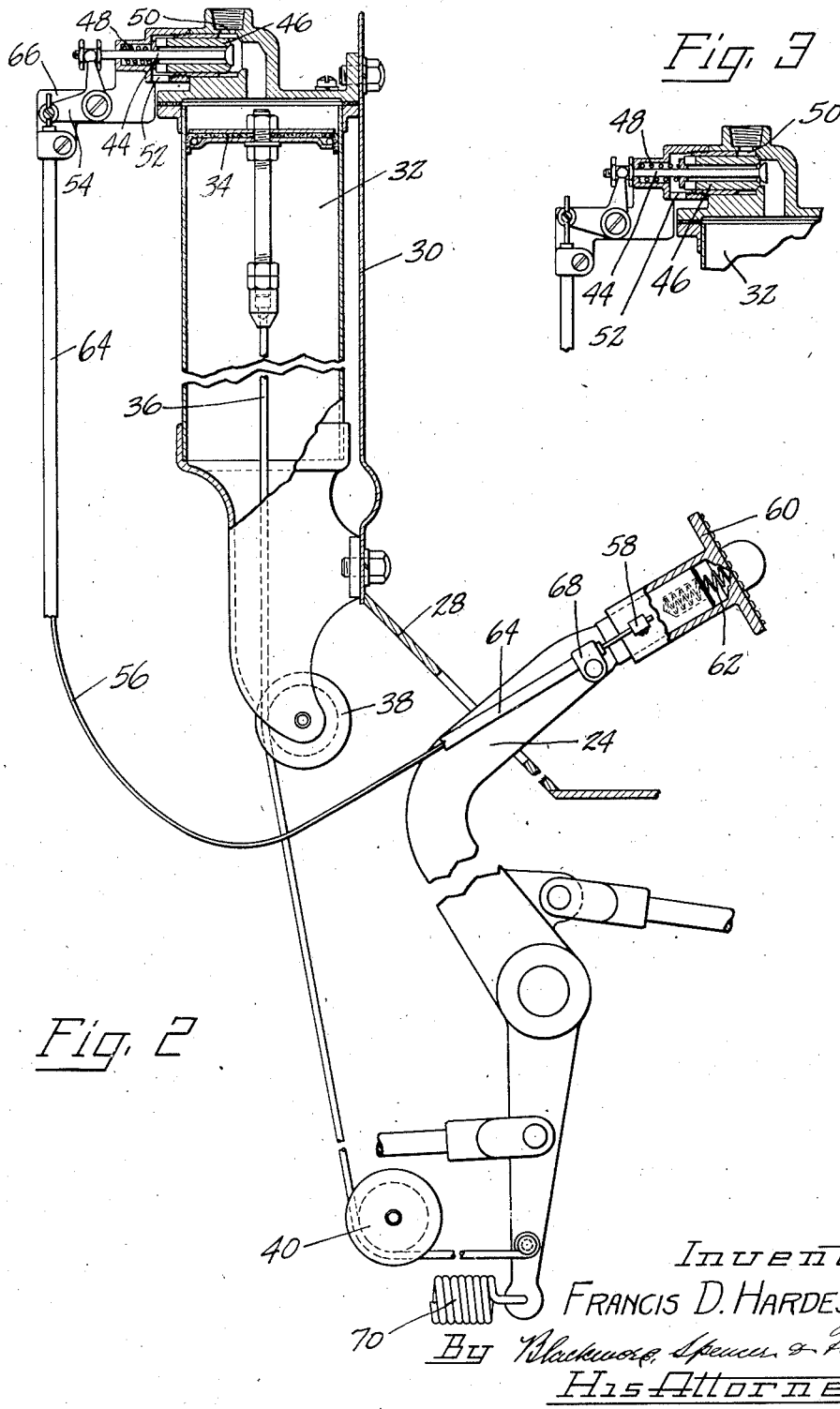

Patented Nov. 6, 1928.

1,690,339

UNITED STATES PATENT OFFICE.

FRANCIS D. HARDESTY, OF DAYTON, OHIO, ASSIGNOR TO GENERAL MOTORS CORPORATION, OF DETROIT, MICHIGAN, A CORPORATION OF DELAWARE.

CONTROLLING DEVICE.

Application filed March 19, 1924. Serial No. 700,303.

This invention relates to controlling devices, and is illustrated in the drawings as embodied in an automobile having road wheel brakes applied manually and returned to idle position when the brake pedal is released by power derived from the engine.

An object of the invention is to provide a light pressure for applying the brakes, or operating some equivalent device, by substituting for the usual heavy return springs a returning or counter-balancing device shown as a power cylinder and piston, which is arranged to be rendered ineffective when the brakes are applied, and which therefore does not detract from the power applied to the brakes as do the heavy return springs. Preferably this returning device is operated by the power of the engine, it being in one desirable construction operated by suction from the intake manifold. A light return spring may also be used, to hold the parts in idle position when the engine is not running.

The above and other objects and features of the invention, including various novel combinations of parts and desirable particular constructions, will be apparent from the following description of one illustrative embodiment shown in the accompanying drawings, in which:

Figure 2 is a view of some of the parts shown in Figure 1, partly in side elevation and partly in vertical section, and on a larger scale; and Figure 3 is a sectional view of the valve shown in Figure 2, in the position it occupies when the brakes are applied.

Figure 1:
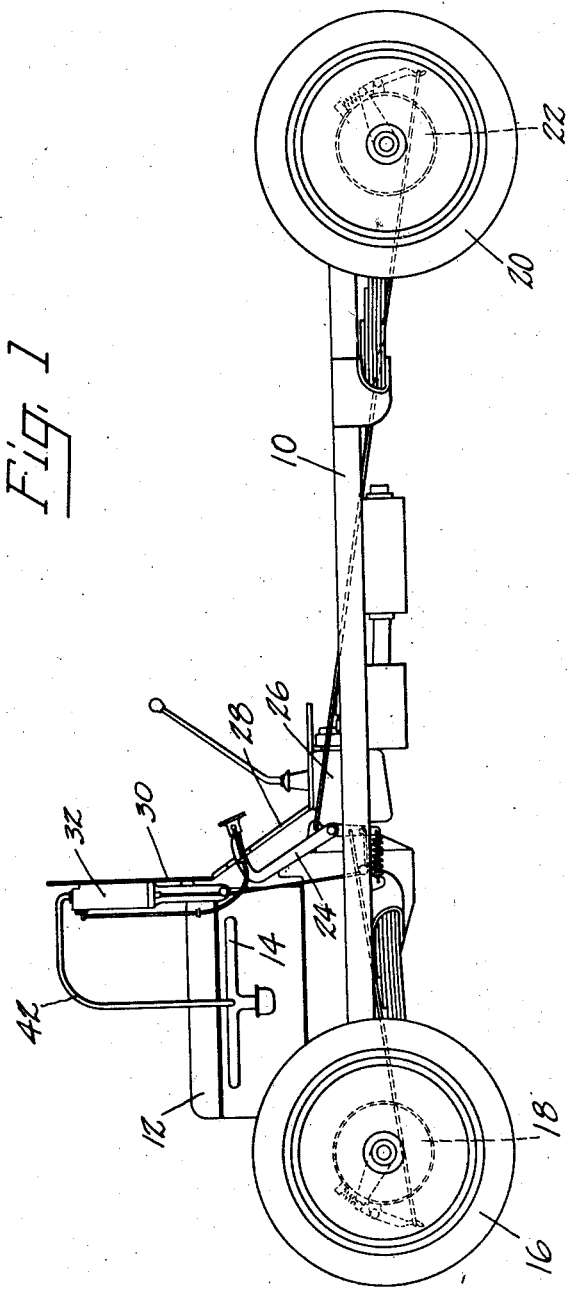
Figure 1 is a diagrammatic side elevation of an automobile chassis having manually-applied and power-released four wheel brakes.

In these figures, the invention is shown embodied in an automobile chassis comprising a frame 10, an engine 12 having an intake manifold 14, front wheels 16 having brakes 18, and rear wheels 20 having brakes 22, all of the brakes being arranged for operation by depression of a pedal 24. The pedal is shown mounted as usual beside a transmission 26 and extending up through a floor board 28, just below the dash 30. The above-described parts may be of any desired construction, the present invention having to do with the release of the brakes after they have been applied. In the usual arrangement, return springs are used for this purpose, which springs must be overcome in applying the brakes, this spring resistance frequently being greater in amount than the pressure on the brakes themselves. According to my invention, however, the brakes are returned by means which is ineffective when the brakes are being applied, thus substantially cutting in two the required pedal pressure.

In the particular embodiment illustrated, the brake-releasing means comprises a power cylinder 32 mounted on the front of dash 30, in which is a piston 34 connected to the lower end of pedal 24 by a cable 36 passing over pulleys 38 and 40. The piston is sucked upwardly to pull on the cable in releasing the brakes by suction from the intake manifold 14, which is connected to the power cylinder by a conduit 42 controlled by a valve shown in its normal or open position in Figure 2, with the suction applied to the piston, and shown in Figure 3 in the position it occupies when the brakes are being applied, with the conduit 42 shut off and cylinder 32 in communication with the outside atmosphere.

The valve includes a central plunger 44 having a head which closes a passage through a sleeve or piston member 46, and which normally forces member 46 to the left in Figure 3 against the resistance of a spring 48. In this position a passage 50 to conduit 42 is open, and cylinder 32 is in communication with the intake manifold, while a passage 52 to the outside atmosphere is shut off by the seating of the head of plunger 44 against the inner end of the bore through the sleeve member 46. Plunger 44 is held in this position against the resistance of spring 48 by a bellcrank lever 54 operated by a Bowden wire 56 clamped at 58 to a sleeve portion of foot-piece 60 of pedal 24, the foot-piece being held spaced from the end of the pedal proper by a spring 62. The casing 64 of the Bowden wire 56 is clamped at one end to the bracket 66 carrying the bellcrank lever 54 and at the other end at 68 to the pedal proper, just below foot-piece 60.

In operation, the parts are normally in the position shown in Figure 2, with spring 62, which is substantially stronger than spring 48, holding the valve open so that the intake suction urges the brakes and their operating connections into idle position.

When the pedal is depressed, before the pedal proper begins to move spring 62 is compressed, and the Bowden wire 56 rocks bellcrank lever 54 to cause the parts to take the positions shown in Figure 3. Passage 50 is now shut off by the piston valve member 46, moved to the right by its spring 48, while plunger 44 has been moved still further to the right, establishing communication between the cylinder 32 and the outside atmosphere through passage 52 and the bore of member 46. This equalizes the pressure on opposite sides of the piston 34, so that it offers no resistance to the application of the brakes as the pedal is further depressed. When the pedal is released, spring 62 promptly returns the valve parts to the positions shown in Figure 2, so that piston 34 takes hold again and pulls the brakes to their idle position. I prefer to provide also a light return spring 70 to hold the brakes and their operating connections in idle position when the engine is not running. Spring 70 need only be under a tension which is a small fraction of the tension on the usual return springs, for example ten pounds instead of forty-five or fifty pounds.

While one illustrative embodiment of the invention has been described in detail, it is not my intention to limit its scope to that particular embodiment or otherwise than by the terms of the appended claims.

I claim:

1. Retarding means comprising, in combination, a brake, a brake-applying member, a counter-balance device urging the brake and said member toward idle position, and connections from said member for first rendering the counter-balance device ineffective and then applying the brake.

2. Retarding means comprising, in combination, a brake, connections for applying the brake, a source of power, a device operated by power from said source and urging the brake and connections toward idle position, and a manually-operated member connected and arranged first to disconnect said device from the source of power and then to cause the connections to apply the brake.

3. Retarding means comprising, in combination, a brake, connections for applying the brake, a source of power, a counter-balance device operated by power from said source and urging the brake and connections toward idle position, and a manually-operated member connected to the counter-balance device and arranged when operated to disconnect said device from the source of power and also arranged to operate said connections to apply the brake manually.

4. A vehicle comprising, in combination, brakes, a manually-operated controlling member, brake-applying connections controlled by said member, a counter-balance device urging the brakes toward idle position, and an auxiliary connection from the controlling member arranged to render the counter-balance device ineffective.

5. A vehicle comprising, in combination, brakes, an engine, a device operated by power from the engine for returning the brakes to idle position, connections for applying the brakes, and manually operable means for interrupting the action of the brake returning device aforesaid, to thereby permit the brakes to be applied manually, and unrestrained by said returning device.

6. A vehicle comprising, in combination, brakes, an engine, and manually operable means for applying the brakes and for bringing about their return to idle position by engine suction.

7. A vehicle comprising, in combination, brakes, an engine having an intake manifold, a cylinder and piston operated by suction from the manifold to return the brakes to idle position, and manually operable means for interrupting the action of said cylinder and piston and for applying the brakes.

8. A vehicle comprising, in combination, an engine, brakes, a pedal, means operated by depression of the pedal to apply the brakes, and engine-operated means rendered effective by release of the pedal to return the brakes to idle position.

9. A vehicle comprising, in combination, brakes, a pedal, means operated by depression of the pedal to apply the brakes, and a power cylinder and piston rendered effective by release of the pedal to return the brakes to idle position.

10. A vehicle comprising, in combination, brakes, a brake-controlling pedal, a power cylinder and piston for returning the brakes after application, a valve for the cylinder, and a connection from the pedal for opening the valve when the pedal is released.

11. A vehicle comprising, in combination, a source of fluid power, a power cylinder and piston, a pedal, and a valve arranged to be operated by the pedal to connect the cylinder to said source when the pedal is released and to connect the cylinder to the outside atmosphere when the pedal is depressed.

12. A vehicle comprising, in combination, an engine having an intake manifold, a power cylinder and piston, a pedal, and a valve operated by the pedal and arranged to connect the cylinder to the intake manifold when the pedal is released and to connect the cylinder to the outside atmosphere when the pedal is depressed.

In testimony whereof I affix my signature.

FRANCIS D. HARDESTY.